United States Patent
Murakami et al.

(10) Patent No.: US 6,912,101 B2
(45) Date of Patent: Jun. 28, 2005

(54) INTEGRATED CIRCUIT AND METHOD OF AUTOMATICALLY SELECTING AN INTERNAL OR AN EXTERNAL NON-VOLATILE MEMORY AS A SOURCE OF PROGRAM CODE RESPONSIVE TO PRESENCE OR ABSENCE OF THE EXTERNAL NON-VOLATILE MEMORY

(75) Inventors: Masayuki Murakami, Fujisawa (JP); Tatsuya Sakai, Yamato (JP); Yasuhiro Takase, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 09/818,485

(22) Filed: Mar. 27, 2001

(65) Prior Publication Data

US 2001/0040750 A1 Nov. 15, 2001

(30) Foreign Application Priority Data

Mar. 28, 2000 (JP) ........................................ 2000-089860

(51) Int. Cl.$^7$ ............................................. G11B 15/18
(52) U.S. Cl. ...................................................... 360/69
(58) Field of Search ............................... 360/69, 77.04; 711/105, 15, 102–103; 713/1, 2, 340; 365/189.03, 230.8; 710/266; 700/297; 257/324; 327/78

(56) References Cited

U.S. PATENT DOCUMENTS

| | | | | |
|---|---|---|---|---|
| 4,488,265 A | * | 12/1984 | Kotecha | ............... 365/189.03 |
| 5,084,791 A | * | 1/1992 | Thanos et al. | ............ 360/77.04 |
| 5,465,343 A | * | 11/1995 | Henson et al. | ............... 711/112 |
| 5,805,854 A | * | 9/1998 | Shigeeda | ........................ 711/1 |
| 6,401,156 B1 | * | 6/2002 | Mergard et al. | ............. 710/266 |

* cited by examiner

Primary Examiner—David Hudspeth
Assistant Examiner—K. Wong
(74) Attorney, Agent, or Firm—Abdy Raissinia; William D. Gill; Dillon & Yudell LLP

(57) ABSTRACT

The present invention is a semiconductor device that includes a DRAM and an internal mask ROM that are implemented on a single integrated circuit substrate. The semiconductor further includes a terminal coupled to an external ROM and a selector for choosing an external ROM or an internal mask ROM for program code loading. If an external ROM is coupled to the aforementioned terminal, the external ROM is given precedence for use in the loading of the aforementioned program code. The control method of the present invention pertains to a semiconductor device including a DRAM, an internal mask ROM, a terminal coupled to an external ROM, a selector for choosing the first path led from the internal mask ROM or the second path led from the terminal, and a coupling determiner deciding whether or not the terminal is coupled to the external ROM. The control method includes the steps of: (a) deciding whether or not the terminal is coupled to the external ROM; (b) selecting a first path when a terminal is not coupled to the external ROM or a second path when the terminal is coupled to the external ROM; and (c) loading a program code from either the internal mask ROM or the external ROM.

15 Claims, 7 Drawing Sheets

[Figure 1]
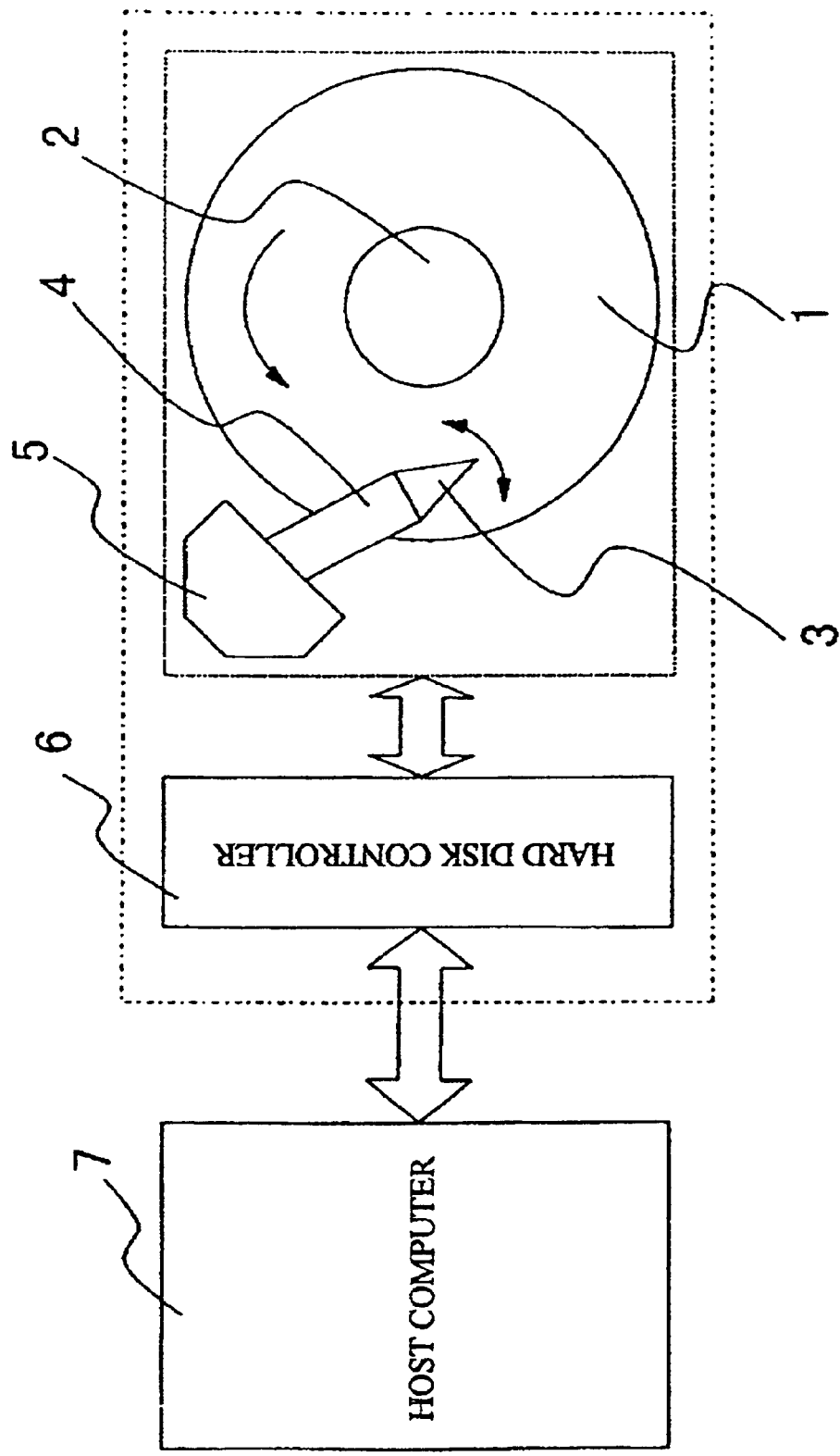

[Figure 2]
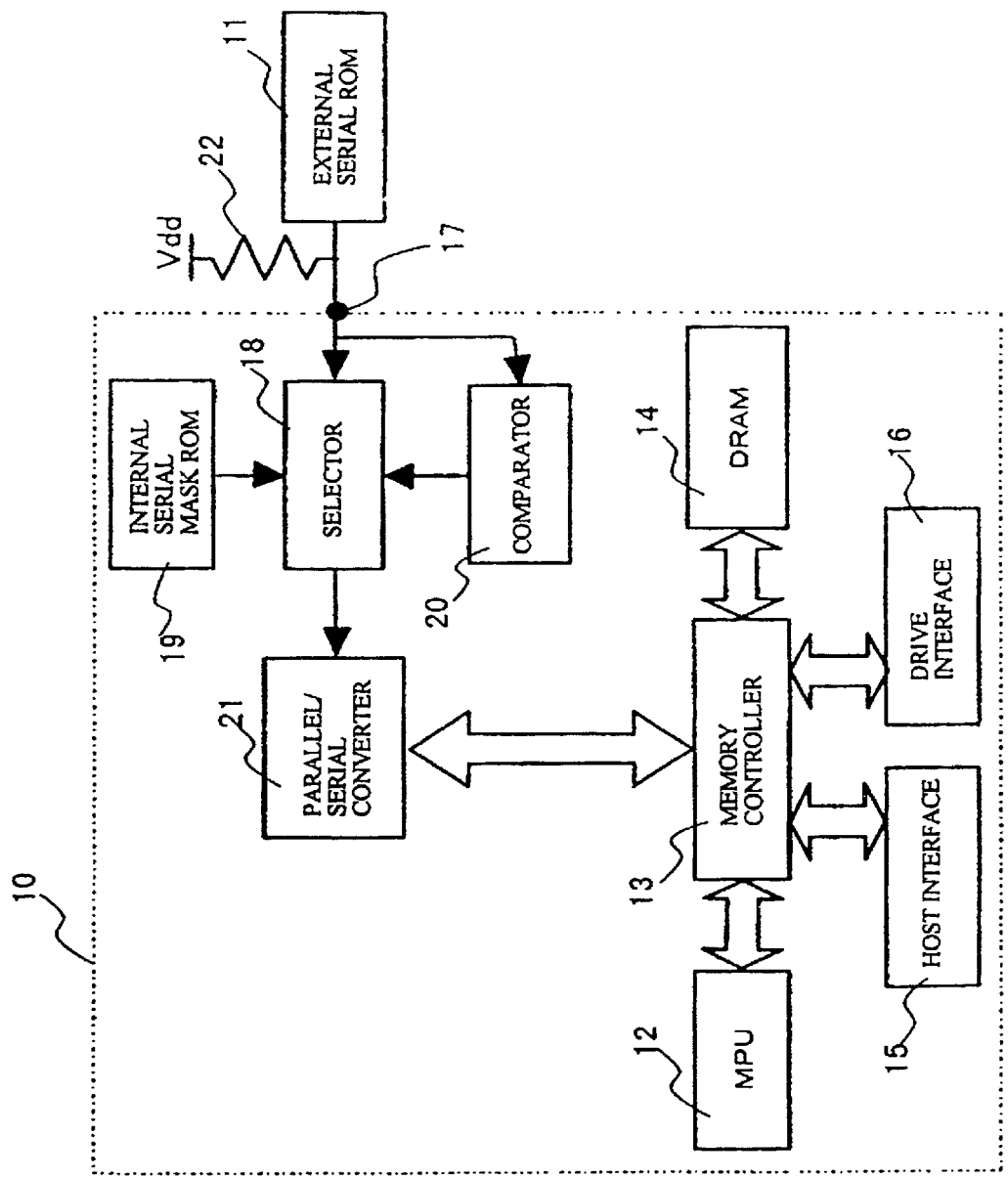

[Figure 3]
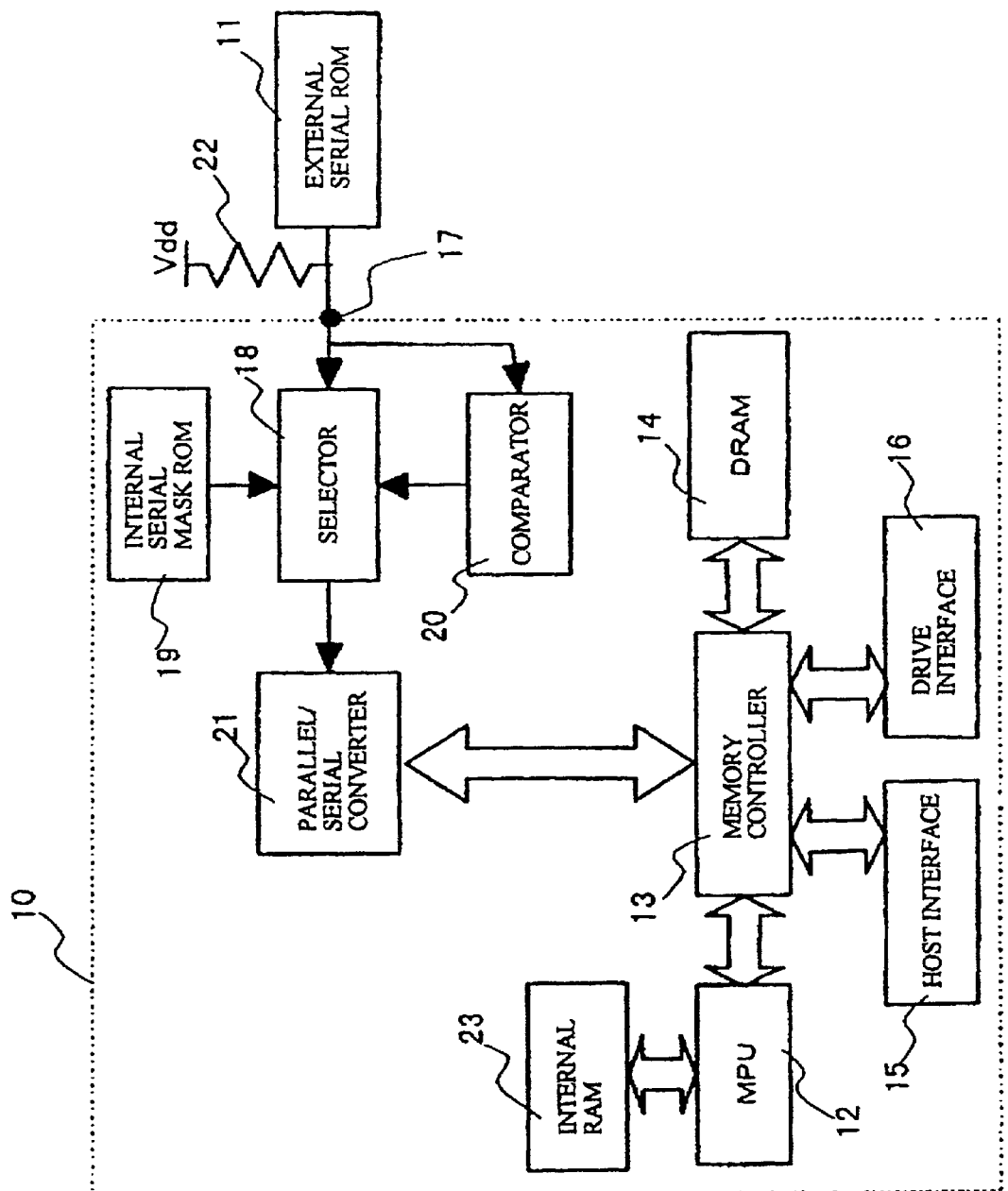

[Figure 4]
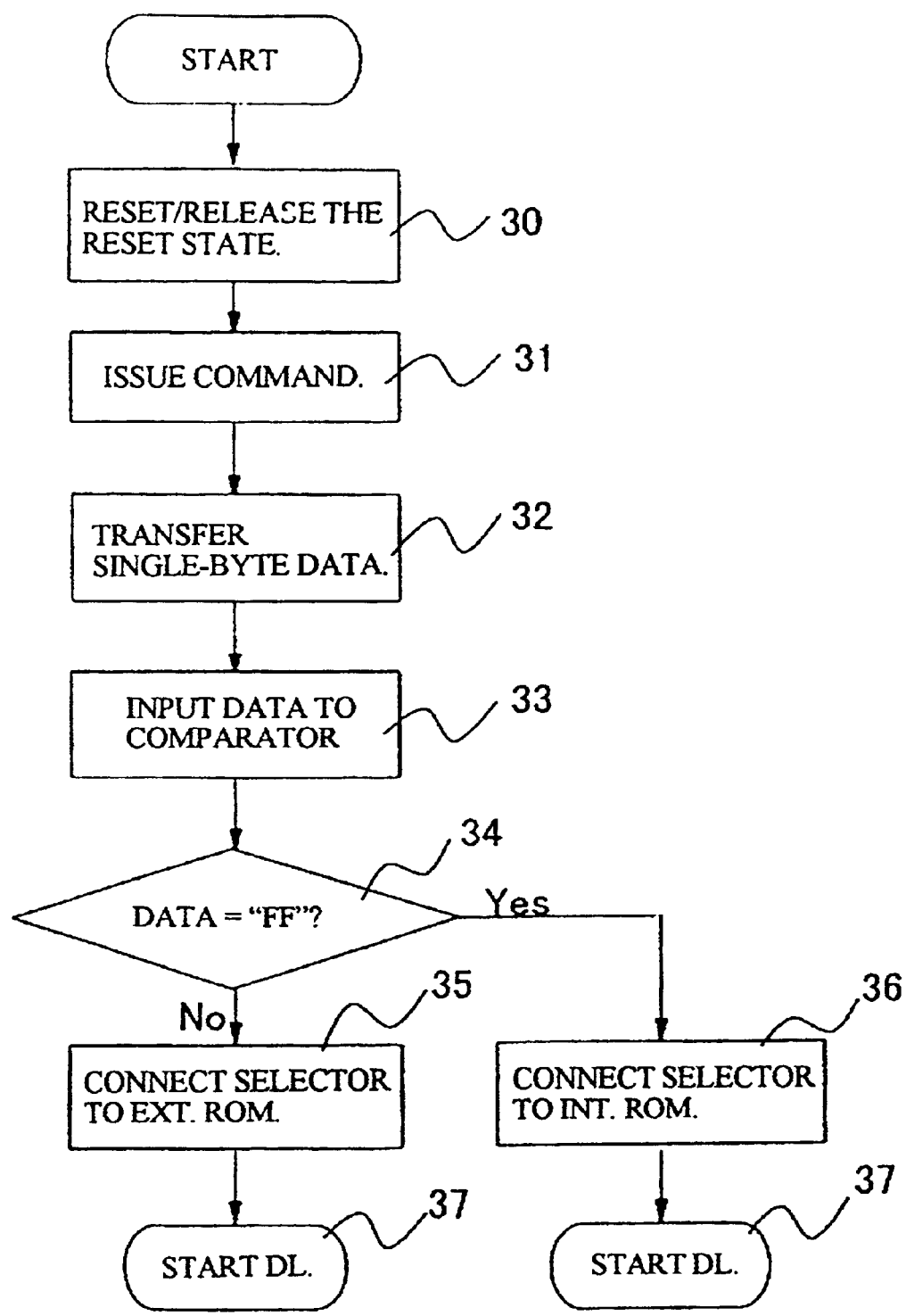

[Figure 5]
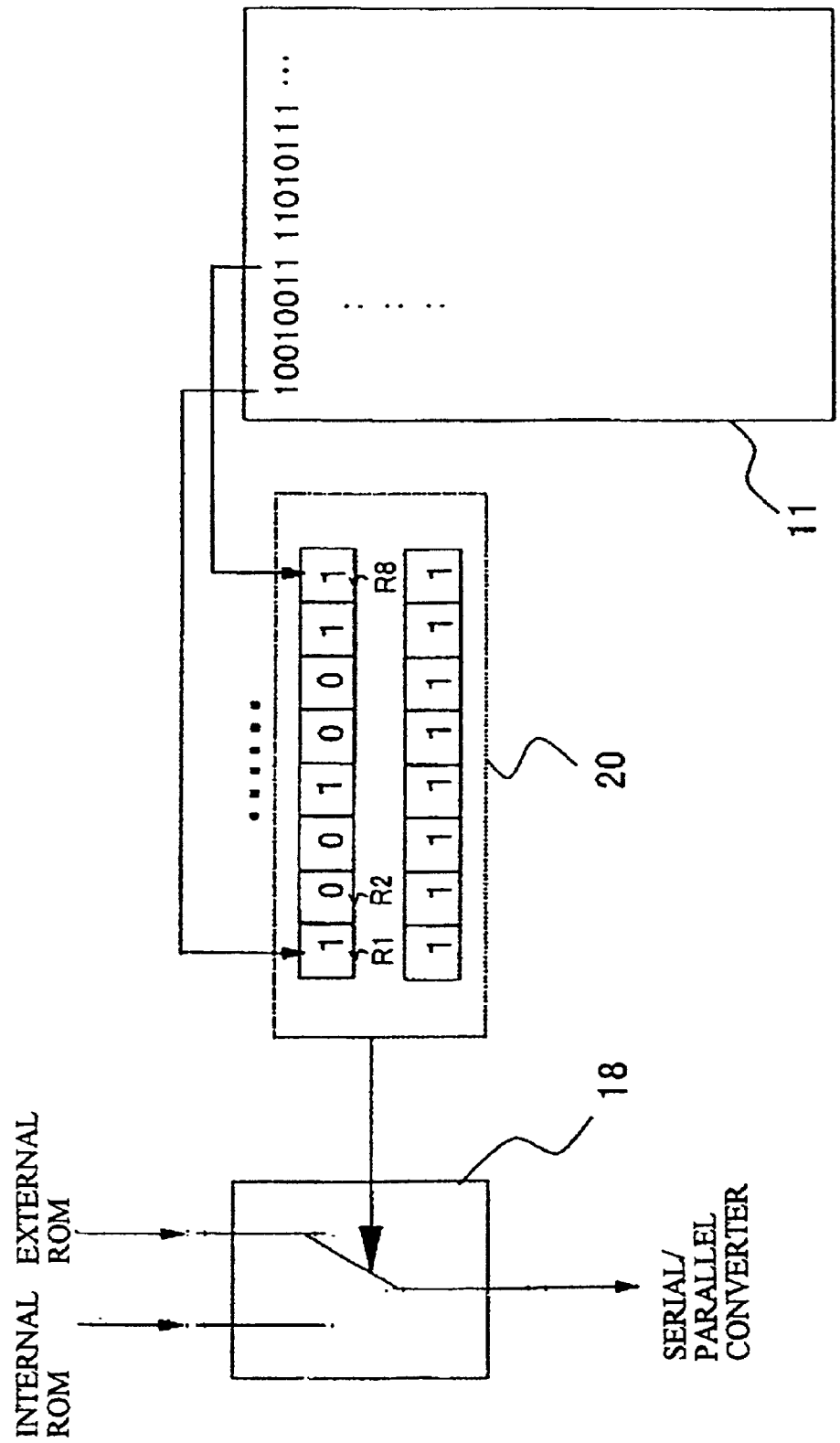

[Figure 6]
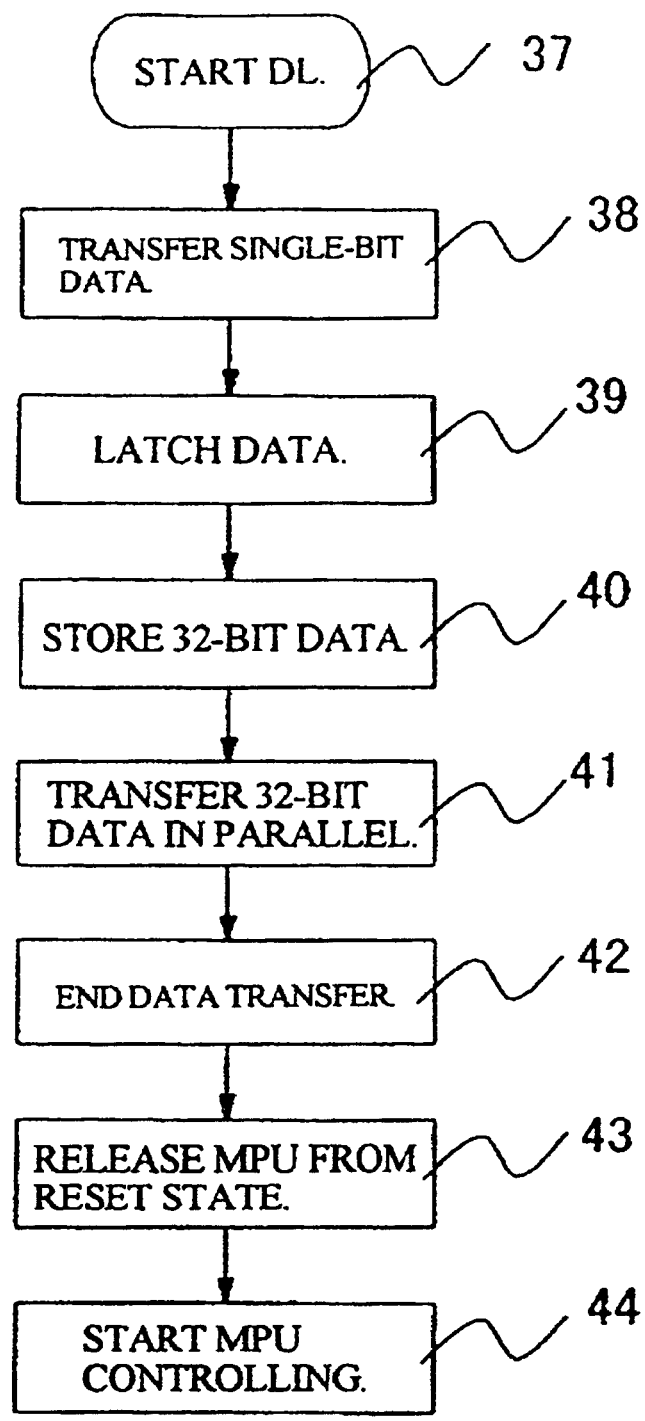

[Figure 7]
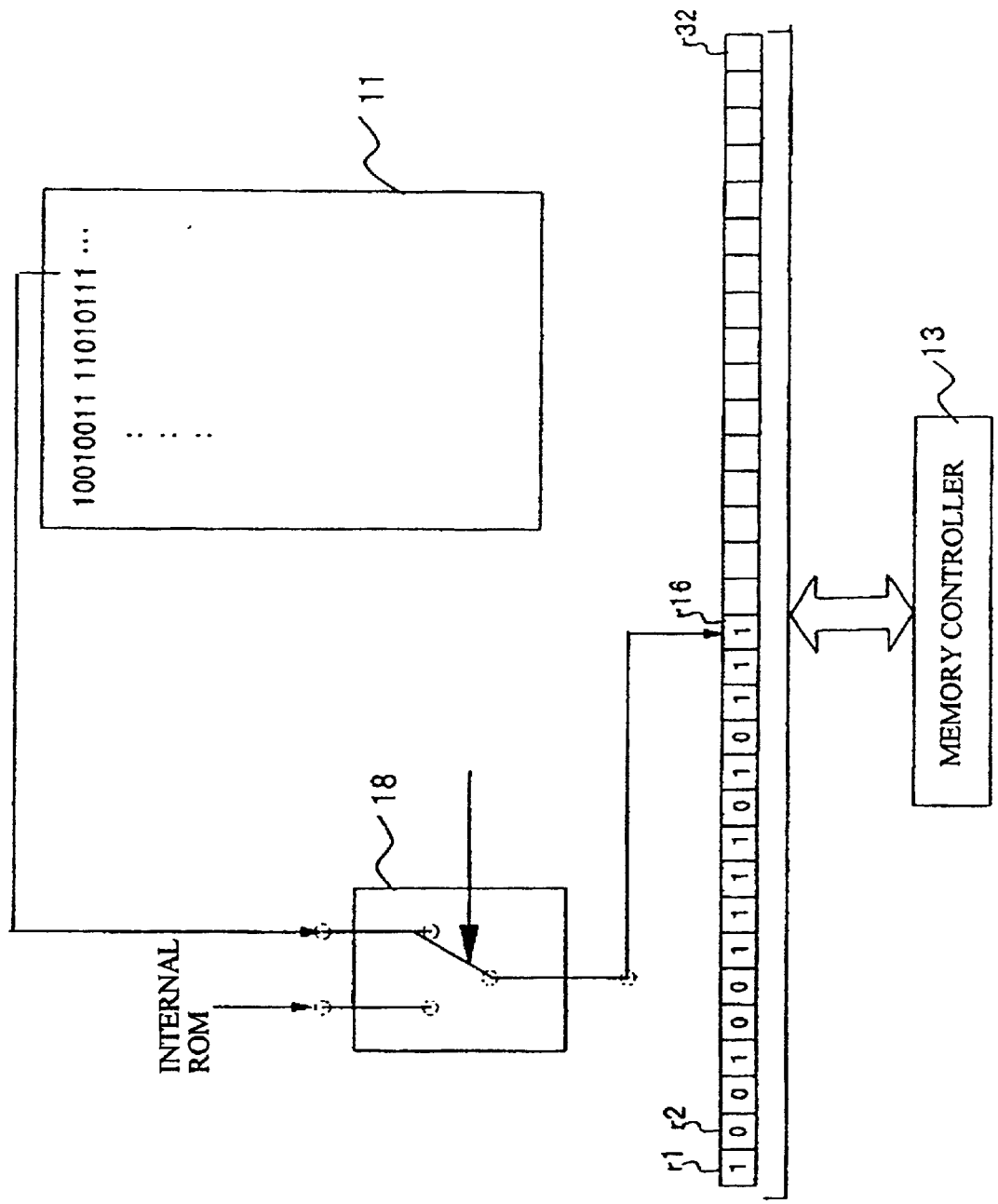

INTEGRATED CIRCUIT AND METHOD OF AUTOMATICALLY SELECTING AN INTERNAL OR AN EXTERNAL NON-VOLATILE MEMORY AS A SOURCE OF PROGRAM CODE RESPONSIVE TO PRESENCE OR ABSENCE OF THE EXTERNAL NON-VOLATILE MEMORY

BACKGROUND OF THE INVENTION

1. Technical Field

The present invention relates in general to the field of semiconductor devices. More particularly, the present invention relates to the field of semiconductor devices incorporating a system memory on a single integrated circuit substrate. Still more particularly, the present invention relates to the field of semiconductor devices incorporating a system memory on a single integrated circuit substrate and a means for modifying instructions for operating the semiconductor devices with minimal production lead time.

2. Description of the Related Art

In recent years, a system large-scale integration (LSI) configuration has been developed that enables logic circuits such as central processing units (CPU), multiprocessing units (MPU), and memory cells of a dynamic random access memory (DRAM) and peripheral circuits to be implemented on a single integrated circuit substrate. The system LSI configuration has many notable advantages. First, there is no need for a conventional external memory element to be included outside the system LSI configuration. This reduces both the manufacturing costs and the size of the integrated circuit substrate. Additionally, an external data (or address) bus coupling an integrated circuit to an external DRAM via an input/output (I/O) pin is not required, since the system LSI configuration integrates the external DRAM. The number of data (or address) buses coupled via I/O pins is no longer a limitation since such connections are made internally on the single integrated circuit substrate. The system LSI configuration is also effective in shortening the trace length of each data bus and improving the overall performance of the system. Finally, the system LSI configuration is a preferred configuration of various peripheral devices of a data processing system, such as a computer system.

If the system LSI configuration is implemented as a semiconductor device utilized as a control element for peripheral devices such as a hard disk drive of a computer system, required instructions for operating the logic circuits must be written to the semiconductor device in advance. Generally, a non-volatile memory device, such as a mask read-only memory (ROM), a programmable read-only memory (PROM), an erasable programmable read-only memory (EPROM), or an electrically erasable programmable read-only memory (EEPROM) is utilized for storing required program instructions or microcodes. It should be readily apparent to those skilled in the art that there exists a trade-off between the controllability and price of the non-volatile memory device. The mask ROM is less costly, but cannot be modified once a set of instructions have been written. Consequently, the instructions must be finalized before the mask ROM is manufactured. The PROM is also less expensive and enables rewriting of a program after the program is written. Both the EPROM and the EEPROM are the more expensive options, although both allow a program to be erased after the program is written therein. A different set of instructions can then be written to either the EPROM or the EEPROM. In recent years, a type of EEPROM, called a flash EEPROM has been developed, so that large capacity and cost effective ROMs that enable rewriting of data electrically are now widely available.

A control element for peripheral devices such as a hard disk drive of a computer system may be developed to include a recording element that enables the rewriting of microcodes. The recording element is required due to the difficulty of microcode development. Early generation microcodes frequently contain program errors or bugs, despite the best efforts of microcode developers. Furthermore, user specifications or requirements might be altered during the development of the microcodes. When a mask ROM is employed in a semiconductor configuration, a few months are required before a reliable final microcode version can be implemented due to the production lead time required for a mask change of the semiconductor device to the completion of the semiconductor device. Considering the rapid generational improvements of hard disk drive technology in recent years, such a lengthy production lead time would exceed a permissible range for timely product releases. Therefore, careful consideration should be given to the employment of an EPROM or EEPROM as a recording element for microcodes. Now that the costs of a flash EEPROM are reduced due to an increase of demand and an increase of storage capacity, some of the controlling elements with logical circuits and a flash EEPROM implemented on a single integrated circuit substrate have been developed and are now in general use.

Ideally, the most favorable topology would be the implementation of a system LSI configuration with a DRAM and a flash EEPROM on a single integrated circuit substrate as a controlling element. However, the system LSI configuration with a DRAM and a flash EEPROM is difficult to implement utilizing conventional manufacturing techniques. Because of this difficulty, the flash EEPROM and the system LSI are mounted separately when the system LSI configuration utilizes a flash EEPROM. A serial flash EEPROM is employed to reduce the necessary number of input/output connections.

Furthermore, a microcode is first stored in a serial type external flash ROM on the assumption that the microcode is often modified in the initial stages of development. When the microcode is finalized, a mask ROM is formed in the system LSI. If the microcode is stored in the mask ROM in the mass-production stage and no problem arises from the manufacturing technique, the abovementioned procedure is considered to be advantageous in both technical and manufacturing cost aspects.

SUMMARY OF THE INVENTION

All objects, features, and advantages of the present invention will become apparent in the following detailed written description.

It is an object of the present invention to provide for an improved semiconductor device.

It is another object of the present invention to provide for an improved semiconductor device incorporating a dynamic random access memory (DRAM) implemented on a single integrated circuit substrate.

It is still another object of the present invention to provide for an improved semiconductor device incorporating a DRAM implemented on a single integrated circuit substrate and a means for modifying instructions for operating the semiconductor device with minimal production lead time.

The present invention is a semiconductor device that implements a set of logic circuits, a DRAM and an internal mask ROM on a single integrated circuit substrate. The semiconductor further includes a terminal coupled to an external ROM and a selector for selecting the external ROM or the internal mask ROM for program code loading. If the external ROM is coupled to the aforementioned terminal, the external ROM is given precedence for loading the aforementioned program code.

The control method of the present invention pertains to a semiconductor device including a set of logic circuits, a DRAM, an internal mask ROM, a terminal coupled to an external ROM, a selector for choosing the first path led from the internal mask ROM or the second path led from the terminal, and coupling detector for deciding whether or not the terminal is coupled to the external ROM. The control method includes the steps of:

(a) deciding whether or not the terminal is coupled to the external ROM;

(b) selecting a first path when a terminal is not coupled to the external ROM or a second path when the terminal is coupled to the external ROM; and (c) loading a program code from either the internal mask ROM or the external ROM.

The program code is loaded via the terminal when the external ROM is coupled. Otherwise, the program code is loaded from the internal mask ROM. The internal ROM may be a low cost mask ROM to reduce the manufacturing costs of the semiconductor device. A flash EEPROM is not desirable due to the difficulties faced in the manufacturing process. However, when a program code is modified, the coupled external ROM can be configured to accepted the modified program code, which is utilized for semiconductor device operation. The semiconductor device includes an interface for reading the external ROM and a separate interface for accessing the internal mask ROM. Modifications are not required of the aforementioned interfaces between the development and mass production stages. The program code can be modified utilizing several different methods. Although both the semiconductor device and the external ROM are required when the external ROM stores the modified program code, the mask of the semiconductor device can be also be modified. Consequently, after the internal mask ROM is modified, there is no need to connect the external ROM. Thus, the present invention introduces the possibility of modifying the program code with a minimal increase of the manufacturing cost and production downtime. The modification of a program in a mask ROM requires changes in the mask of the semiconductor device. A performance test has conventionally been required for the completed semiconductor device after such modifications have been made. In the present invention, product verification time can be saved, since the external ROM is coupled to the semiconductor device. Consequently, the lead time required after modification of the program can be greatly minimized, since there is no need to modify the delivery plan of a product incorporating a preferred embodiment of the present invention.

A loading selector includes a coupling detector for deciding whether or not the terminal is coupled to the external ROM and a path selector for selecting either the terminal or the internal mask ROM for program loading. The path selector can select a first path from the internal mask ROM when the terminal is not coupled to the external ROM and a second path from the terminal when the terminal is coupled to the external ROM according to a signal from the connection decision means. The connection decision means includes a comparator, which outputs either a signal with which the path selector selects the first path when a single-byte input is "00" (hexadecimal) or "FF" (hexadecimal) or a signal with which the second path in case the single-byte input is neither "00" (hexadecimal) nor "FF" (hexadecimal) while the terminal is coupled to either a ground or a low level potential, or to either a power supply potential or a high level potential via a pull-up resistor.

A jump command or a destination address is usually located in a initial part of a program code. Therefore, neither "00" (hexadecimal) nor "FF" (hexadecimal) is located in the initial part of any program code. The present invention determines that an external ROM is not coupled to the terminal when the comparator ascertains that a single-byte input from the terminal is "00" or "FF" (hexadecimal). Also, the single-byte input from the terminal becomes "00" (hexadecimal) when the terminal is coupled to a ground potential (or a low level potential) and the external ROM is not coupled. When the terminal is coupled to a power supply potential (or a high level potential) via a pull-up resistor and the external ROM is not coupled, the single-byte input from the terminal becomes "FF" (hexadecimal). Consequently, the terminal potential cannot become unstable when the external ROM is not coupled. Therefore, the status of the terminal connection can be detected.

The program code of the present invention can be stored in the DRAM provided in the semiconductor device or in a RAM coupled to the arithmetic circuit via a bus. Consequently, the program code can be rapidly processed, thereby improving the operation speed of the semiconductor device, which in turn improves the performance of the entire system. Loading the program code involves a method for serial code input from the terminal or via the internal mask ROM. The program code is then converted from single-bit data to plural-bit data in a serial/parallel convertor. Then, the plural-bit data is processed in parallel and transferred to a memory controller.

Furthermore, the semiconductor device of the present invention is especially effective when employed as a hard disk controller. It should be readily apparent to ones skilled in the art that in recent years, hard disk drive technology has been developing very rapidly. For a product with constant modification and specification changes, a major advantage is rapid and cost-effective modification of the program code necessary to operate the semiconductor device.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 illustrates a conceptual block diagram of a hard disk drive which may be utilized to implement a preferred embodiment of the present invention;

FIG. 2 depicts a block diagram of a single-chip semiconductor with an external serial ROM implemented as a hard disk controller device, in accordance with a preferred embodiment of the present invention;

FIG. 3 illustrates a block diagram of a semiconductor device which may be utilized to implement another preferred embodiment of the present invention;

FIG. 4 depicts a flowchart for illustrating part of a control method in accordance with a preferred embodiment of the present invention;

FIG. 5 illustrates a block diagram depicting how data analyzed by a comparator in accordance to a preferred embodiment of the present invention;

FIG. 6 is a flowchart for depicting how a program code is downloaded; and

FIG. 7 depicts a block diagram for an example of the operation of a parallel/serial converter.

DESCRIPTION OF THE PREFERRED EMBODIMENT

A preferred embodiment of the present invention will be described in detail with reference to the accompanying drawings. However, the present invention is not limited only to a preferred embodiment; it may be varied freely without departing from the spirit of the invention.

Referring now to the figures, and referring in particular to FIG. 1, there is depicted a conceptual block diagram of a hard disk drive according to a preferred embodiment of the present invention. The hard disk drive in a preferred embodiment includes: a disk-like magnetic recording medium 1 for the magnetic recording of information; a spindle motor 2 for rotating magnetic recording medium 1; a head 3 for reading or writing information to magnetic recording medium 1; an arm 4 for supporting head 3; and a voice coil motor 5 for driving arm 4. The hard disk drive further includes a hard disk controller 6 for controlling the input/output (I/O) of information from head 3 or driving both spindle motor 2 and voice coil motor 5. Hard disk controller 6 interfaces with a host computer 7 to read or write information on magnetic recording medium 1 according to a read/write request from host computer 7.

With reference to FIG. 2, a block diagram of a single-chip semiconductor device 10 and an external serial ROM 11 implemented for hard disk controller 6 is depicted. Single-chip semiconductor device 10 includes a multiprocessing unit (MPU) 12; a memory controller 13; a DRAM 14; a host interface 15; a drive interface 16; a terminal 17 coupled to external serial ROM 11; a selector 18; an internal serial mask ROM 19; a comparator 20; and a parallel/serial converter 21. External serial ROM 11 may be a serial flash EEPROM. Employment of the serial flash EEPROM introduces the possibility of reducing the number of terminals required for a data interface with semiconductor device 10. MPU 12 may be a logical arithmetic circuit coupled to a 32-bit data bus. MPU 12 controls the input/output of data from host computer 7 via host interface 15. MPU 12 also controls the reading and writing of information from magnetic recording medium 1 via drive interface 16 and the driving of arm 4 and spindle motor 2. The program codes utilized for those control operations are stored in DRAM 14. Memory controller 13 controls mutual data communications among DRAM 14, MPU 12, host interface 15, drive interface 16, and parallel/serial converter 21.

DRAM 14 is a general-purpose memory element, which is implemented with other elements on a single integrated circuit substrate in the semiconductor device of the present invention. Manufacturing costs can be reduced and the number of data buses allowed is increased when the DRAM is implemented on the same integrated circuit substrate. For example, a conventional semiconductor device must have thirty-two external terminals if the semiconductor device is coupled to a 32-bit bus. However, the present invention enables the data bus to be wired on the semiconductor substrate, so that no external connections are required for the data bus. When the data bus is expanded to a 64-bit bus, the necessary number of the external terminals is provided accordingly. Considering that the number of external terminals must be appropriately increased when a DRAM is externally coupled to the semiconductor device, it should be apparent to those skilled in the art that as the number of data buses is increased, the more advantageous the present invention will become.

DRAM 14 stores a loaded program code. MPU 12 loads the program code from DRAM 14 for processing. As to be described later, MPU 12 and DRAM 14 are coupled via a bus including multiple data lines, so the program code, after it is stored in DRAM 14, is transferred in parallel, preserving the high processing rate of MPU 12. Host interface 15 couples host computer 7 and hard disk controller 6. Drive interface 16 couples hard disk controller 6 and the hard disk drive.

Terminal 17 is coupled to external serial ROM 11 and one end of pull-up resistor 22. The other end of pull-up resistor 22 is coupled to a power supply potential Vdd (high level). Pull-up resistor 22 is provided to set the potential of terminal 17 to Vdd when terminal 17 is not coupled to external serial ROM 11. Because the potential of terminal 17 is kept at Vdd when terminal 17 is not coupled to external serial ROM 11, a single-byte input from terminal 17 is detected by a method that determines that terminal 17 is not coupled to external serial ROM 11 when the input is "FF" (hexadecimal). When terminal 17 is coupled to external serial ROM 11, the potential of terminal 17 goes low or high according to the information stored in external serial ROM 11. When the potential of terminal 17 is low, a current flows in pull-up resistor 22 so that the potential at both ends of pull-up resistor 22 is kept at Vdd. The other end may be coupled to a ground potential instead of pull-up resistor 22 to form a pull-down resistor. In this case, while terminal 17 is not coupled to external serial ROM 11, the single-byte input from terminal 17 is determined to be "00" (hexadecimal).

Selector 18 functions as a means for selecting whether to load a program code from external serial ROM 11 or from internal serial mask ROM 19. Selector 18 also functions as a switching means for switching according to an output of comparator 20. For example, selector 18 may be configured by a gate of a CMOS circuit that receives the output of comparator 20.

Internal serial mask ROM 19 is a read-only memory element in which a program code is stored. The program code is recorded in such a manner that a wiring mask or a diffusion layer mask of a transistor constituting a ROM is designed to be adaptable to the program, and a circuit functioning as a program is configured as hardware. Utilizing a mask ROM reduces the number of external elements required to store a program. The introduction of a low cost mask ROM reduces the manufacturing costs of the semiconductor device. Because the manufacture of the mask ROM does not restrict the manufacturing technique of the above-described system LSI, no problems arise from the aforementioned manufacturing technique. However, problems are encountered when a flash EEPROM is implemented on a single integrated circuit substrate.

When the semiconductor device of the present invention is mass produced, the program code stored in internal serial mask ROM 19 is utilized. Consequently, a reduction of the cost of the semiconductor device can be expected. If the program code stored in internal serial mask ROM 19 is modified, the modified program code is stored in external serial ROM 11, which is coupled to terminal 17. Hence, the modified program code stored in external serial ROM 11 is loaded and executed instead of the corresponding program code stored in internal serial mask ROM 19. In a preferred embodiment of the present invention, external serial ROM 11 enables rapid program modification. And, modification of a wiring mask or a diffusion layer mask can be arranged to save the time for the future manufacture of the semiconductor devices. When a semiconductor device is manufactured corresponding to the modified program code, external serial ROM 11 is removed to minimize the manufacturing costs. Therefore, the semiconductor device can adapt quickly with program code modifications, thereby minimizing the increase of manufacturing costs.

Comparator 20 compares a single-byte input from terminal 17 with "FF" (hexadecimal). If the single-byte input is "FF", comparator 20 determines that the external serial ROM is not coupled to terminal 17. This determination is performed on the basis that usually no "FF" code is put in the initial part of any program code. Comparator 20 is includes a function for detecting whether or not the external serial ROM is coupled to terminal 17. The detection result is relayed to selector 18, so that the source of the loaded program is selected as described above. If terminal 17 is coupled to the ground potential via a pull-down resistor, the single-byte data is compared with "00" (hexadecimal) in comparator 20.

Parallel/serial converter 21 converts serial data to parallel data. In a preferred embodiment of the present invention, the external ROM is a serial ROM. Employment of the serial ROM reduces the number of connection terminals required. Because the external serial ROM 11 is utilized, a serial ROM can be utilized as the internal ROM to maintain the consistency of input interfaces. On the other hand, the DRAM in which program data is stored is coupled via a bus including multiple data lines. Consequently, MPU 12 or memory controller 13 are also coupled via a bus including the same number of data lines. This is why parallel/serial converter 21 is utilized to convert serial data to parallel data. Parallel data converted from serial data is processed in parallel, thereby increasing the processing speed of a system that includes a preferred embodiment of the present invention.

While the description above is an example in which a program code to be loaded is stored in DRAM 14, the program code may also be stored in an internal RAM 23 included and coupled to MPU 12 via a bus as shown in FIG. 3. In this case, MPU 12 reads the program code from this internal RAM 23 directly to improve the processing speed during an operation.

Next, a description of a control method in a preferred embodiment of the present invention is depicted with reference to a flowchart illustrated in FIG. 4, which shows only part of the control method. At first, the entire semiconductor device is reset when the semiconductor device is powered or when a reset signal is received. All the elements except for MPU 12 are then released from the reset state (step 30). MPU 12 is kept in the reset state until the program code is downloaded. Next, a command for reading single-byte data is issued to external serial ROM 11 (step 31). This command is issued from a hardware component when the reset signal is reset. In response to the command, external serial ROM 11 transfers single-byte data (step 32). The transferred data is serially relayed to comparator 20 bit-by-bit (step 33). FIG. 5 depicts how the data is transferred in the above described process. FIG. 5 illustrates a block diagram depicting how data is relayed to and compared in comparator 20.

Comparator 20 include registers (R1 to R8) for storing single-byte data. Register R1 stores the first bit of the start data transferred from external serial ROM 11 and register R2 stores the second bit of the start data. External serial ROM 11 continues the sequential data transfer until the eighth bit is stored in register R8. When the eighth data is stored in register R8, it is decided whether or not the input data is "FF" (hexadecimal), that is, "11111111" (decimal) (step 34). In the example illustrated in FIG. 5, because external serial ROM 11 is coupled to the terminal and "93" (hexadecimal), or "10010011" (decimal) is recorded in the start data, "1", "0", "0", "1", "0", "0", "1", and "1" are stored in registers R1 to R8. And, because the data is not "FF" (hexadecimal), comparator 20 outputs, for example, a "low" level signal. At this time, selector 18, receiving the "low" level signal, configures the circuit so that the path to the external ROM (external serial ROM 11) is selected (step 35).

However, if external serial ROM 11 is not coupled to terminal 17, the input of terminal 17, or comparator 20 is pulled up by pull-up resistor 22. Thus, "FF" data is stored in registers R1 to R8. In this case, comparator 20 outputs a "high" level signal. Selector 18, receiving this "high" level signal, selects the path to internal serial mask ROM 19 (step 36). If external serial ROM 11 is coupled to terminal 17 and the start data is "FF", the connection of external serial ROM 11 is not detected. However, "FF" is never usually set in the initial part of a program code. Even when "FF" is set in the start data, resistor 22 can be replaced with a pull-down resistor to keep the other end of the resistor at the ground potential (0V), and then comparing single-byte data with "00". If terminal 17 is coupled to the ground potential (or a low level potential), the single-bit data is compared with "00". Other configuration items remain the same. While single-byte (8-bit) data has been compared in this example, the data may also be shorter or longer than eight bits; for example, the data may be four bits, sixteen bits, and thirty-two bits. After selector 18 selects a path as described above, down-loading (DL) of the program code starts (step 37).

FIG. 6 depicts a flowchart for describing how a program code is down-loaded step by step. The program code is downloaded from either external serial ROM 11 or internal serial mask ROM 19 as described above and selector 18 determines the downloading source. Both of ROMs 11 and 19 are serial ROMs, so data is downloaded bit by bit, or serially (step 38). Each single-bit data to be downloaded is sequentially relayed to registers r1 to r32 provided in parallel/serial converter 21 and latched in the aforementioned registers r1 to r32 (step 39). This process will be described below with reference to FIG. 7.

In FIG. 7, external serial ROM 11 is selected. If internal serial mask ROM 19 is selected, data is downloaded from ROM 19. The first bit data "1" is relayed to register r1 from external serial ROM 11 via selector 18. The data in the second and subsequent bits are sequentially relayed to registers r2 to r32. FIG. 7 shows a case in which the sixteenth bit of the data is relayed to register r16. When 32-bit data is stored (step 40), the 32-bit data is transferred in parallel via multiple data lines (step 41). The data is then transferred to DRAM 14 via memory controller 13. Registers r1 to r32 prepare for the next data write when the present data write has ended. The serial data in the thirty-third and subsequent bits are relayed to registers r1 and r32 when the parallel transfer ends in the same process as described above. And, when 32-bit data is stored in registers r1 to r32, the 32-bit data is transferred to DRAM 14 in parallel as described above. The above processing procedure ends when all the data stored in the ROM is transferred. When the transfer ends (step 42), MPU 12 is released from the reset state (step 43). MPU 12 then operates according to the instructions in the downloaded program (step 44). According to a preferred embodiment of the present invention, there is a determination of whether or not the external ROM is coupled. If the external ROM is coupled, program downloading from the external ROM takes precedence. However, if the external ROM is not coupled, program downloading is performed from the internal ROM. Consequently, even when the program in the internal ROM is modified, the semiconductor device of the present invention can be utilized, since the modified program is stored in and downloaded from the external ROM. And, while program downloading is performed from the external ROM, the mask of the semiconductor is modified so as to adapt to the program modification in the internal ROM and the manufacture of the semiconductor device continues. The semiconductor device can operate without utilizing the external ROM. Utilizing a preferred embodiment of the present invention minimizes manufacturing costs through rapid program modifications and alterations to the internal mask ROM.

Furthermore, the semiconductor device of the present invention includes both an interface for downloading a program code from the external ROM and another interface for downloading a program code from the internal ROM. Consequently, the external ROM is utilized in the development stage to quickly adapt to the frequent modifications of the program code and the internal ROM is utilized in the mass production stage to reduce manufacturing costs. And, according to a preferred embodiment of the present invention, there is no need to modify the specifications of the interface for downloading a program code between development and mass production stages. The reevaluation and testing step required for the LSI after the specifications are changed is eliminated.

While the present invention has been described in detail with reference to a preferred embodiment, the present invention is not limited only to the embodiment; the embodiment may be modified freely without departing from the spirit of the invention.

What is claimed is:

1. A semiconductor device, comprising:
    a single integrated circuit substrate including:
        a volatile memory;
        an internal non-volatile memory
        a terminal for optionally coupling an external non-volatile memory device to said semiconductor device; and
        a selector system coupled to said internal non-volatile memory and said terminal, wherein said selector system selects a single source from which to load a program code into said volatile memory from among said external non-volatile memory and said internal non-volatile memory device based upon whether or not said external non-volatile memory device is coupled to said terminal, said selector system including:
            a coupling detector for detecting whether or not said external non-volatile memory device is coupled to said terminal; and
            a source selector, coupled to said coupling detector, for selecting said internal non-volatile memory as said source in response to said coupling detector detecting that said external non-volatile memory device is not coupled to said terminal and for selecting said external non-volatile memory device as said source in response to said coupling detector detecting that said external non-volatile memory device is coupled to said terminal.

2. The semiconductor device according to claim 1, wherein said coupling detector further comprises:

a comparator that outputs a signal indicative of absence of said external non-volatile memory device responsive to said terminal having a predetermined input value.

3. The semiconductor device according to claim 2, wherein said predetermined input value represents a reference voltage.

4. The semiconductor device according to claim 1, and further comprising a memory controller coupled to said selector system that issues a read command to said selector system to load said program code.

5. The semiconductor device according to claim 1, wherein said volatile memory comprises a dynamic random access memory (DRAM).

6. The semiconductor device according to claim 1, wherein said semiconductor device is a hard disk controller and further comprises:
    a drive interface that couples said semiconductor device to a hard disk drive and relays data; and
    a host interface that couples said semiconductor device to a host computer and relays data.

7. The semiconductor device according to claim 1, wherein said internal non-volatile memory comprises a Read Only Memory (ROM).

8. The semiconductor device according to claim 1, and further comprising:
    a serial-to-parallel converter, coupled between said selector system and said volatile memory, that converts said program code from serial to parallel format prior to storage of said program code into said volatile memory.

9. A method for controlling a semiconductor device that includes an internal volatile memory, an internal non-volatile memory, and a terminal for optionally coupling an external non-volatile memory device to the semiconductor device, said method comprising:
    detecting whether or not an external non-volatile memory device is coupled to said terminal;
    in response to said detecting, selecting a single one of said internal non-volatile memory and the external non-volatile memory device as a source of a program code, wherein said internal non-volatile memory is selected as the source if the external non-volatile memory device is not coupled to said terminal and the external non-volatile memory device is selected as the source if the external non-volatile storage device is coupled to said terminal; and
    loading a program code from said selected source into the internal volatile memory.

10. The method for controlling a semiconductor device according to claim 9, wherein said step of detecting comprises:
    comparing an input value present at said terminal with a predetermined input value.

11. The method for controlling a semiconductor device according to claim 10, wherein said predetermined input value represents a reference voltage.

12. The method for controlling a semiconductor device according to claim 9, wherein said loading comprises serially transmitting said program code from said selected source to a serial/parallel converter within said semiconductor device; and
    converting said program code from serial to parallel format at said serial/parallel converter; and
    transmitting said program code in parallel format from said serial/parallel converter to said volatile memory.

13. The method of controlling a semiconductor device according to claim 9, wherein said loading comprises loading said program code in response to a read command by a memory controller.

14. The method for controlling a semiconductor device according to claim 9, and further comprising controlling operation of a disk drive responsive to said program code.

15. A hard disk drive comprising:
- a hard disk recording medium;
- a medium driver;
- a magnetic head located at the tip of an arm; and
- a controller that controls driving of said hard disk recording medium by said medium driver, movement of said arm, and transfer of data to and from said hard disk recording medium via said magnetic head according to a program code, wherein said controller comprises a single integrated circuit substrate including:
    - a volatile memory;
    - an internal non-volatile memory;
    - a terminal for optionally coupling an external non-volatile memory device to said semiconductor device; and
    - a selector system coupled to said internal non-volatile memory and said terminal, wherein said selector system selects a single source from which to load a program code into said volatile memory from among said external non-volatile memory and said internal non-volatile memory device based upon whether or not said external non-volatile memory device is coupled to said terminal, said selector system including:
        - a coupling detector for detecting whether or not said external non-volatile memory device is coupled to said terminal; and
        - a source selector, coupled to said coupling detector, for selecting said internal non-volatile memory as said source in response to said coupling detector detecting that said external non-volatile memory device is not coupled to said terminal and for selecting said external non-volatile memory device as said source in response to said coupling detector detecting that said external non-volatile memory device is coupled to said terminal.

* * * * *